March 14, 1961
W. K. WARNOCK ET AL
2,974,432
PRESS-FREE CREASE RETAINED GARMENTS
AND METHOD OF MANUFACTURE THEREOF
Filed Feb. 20, 1956
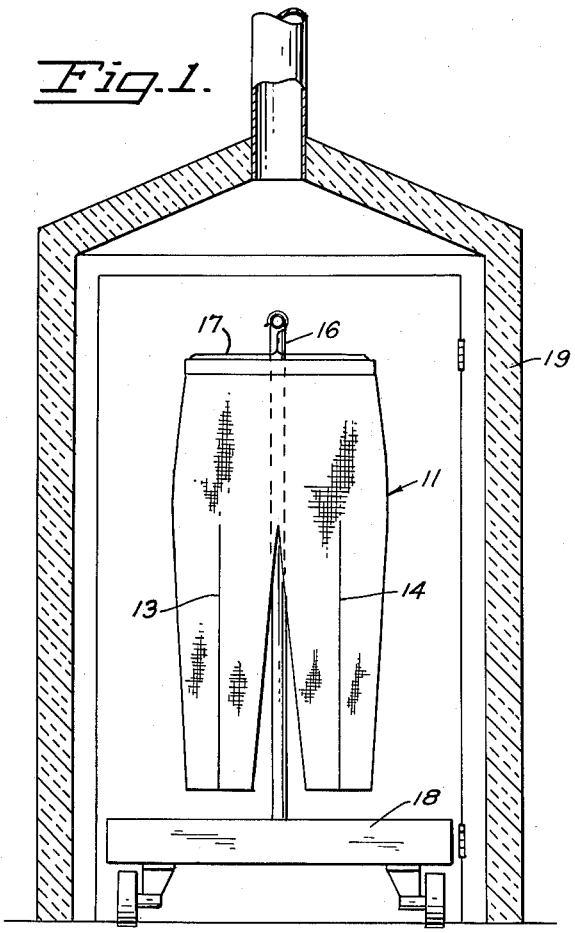
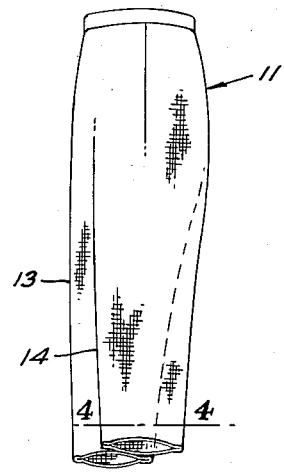
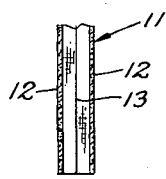
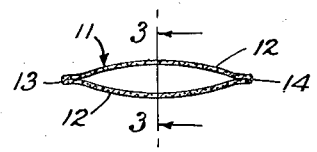
INVENTORS
WILLIAM K. WARNOCK
FRANK G. HUBENER
BY
ATTORNEY

United States Patent Office 2,974,432
Patented Mar. 14, 1961

2,974,432

PRESS-FREE CREASE RETAINED GARMENTS AND METHOD OF MANUFACTURE THEREOF

William K. Warnock, Kentfield, and Frank G. Hubener, San Carlos, Calif., assignors to Koret of California, San Francisco, Calif., a corporation of California Filed Feb. 20, 1956, Ser. No. 566,748

4 Claims. (Cl. 38—144)

The invention, in general, relates to garment manufacture and more particularly relates to an improved method of production of garments of variable sizes, types and styles which, despite numerous and repeated washings, are free from wrinkles, retain all pleating and creases made therein during manufacture, and require no pressing to afford presentable, attractive and neat appearing apparel.

In recent years, various methods have been developed in the art for treating fabrics to impart durable crease resistance to the fabrics. The majority of these methods involve the use of thermo-setting resins and, in the early stages of these developments, the fabric was impregnated with an aqueous solution of a single resin of this type, and dried at a temperature sufficiently high to effect polymerization of the resin or setting thereof in the fabric. Due to the harsh effects of the resins on the fibers, which were rendered unduly brittle, the tensile strength as well as tear strength of the fabric suffered considerably and garments made therefrom had but little life and durability. Later developments have overcome these disadvantages to some extent by impregnating the fabrics with an aqueous solution of a mixture of two or more thermosetting resins together with softeners and the like, drying the treated fabric, and thereafter curing or setting the mixed resins in the fabric by polymerization of the resins by heat either as the fabric is being dried or during a stage of mechanically pleating the same. However, garments made from fabrics containing resins which have thus been set cannot be given durable creases and substantially all garments manufactured in accordance with the foregoing methods of curing and setting the resin in the fabric previously to creasing must be carefully pressed after washing or cleaning and creases re-set therein by hand or mechanical pressing.

A primary object of our invention is to provide a method of manufacturing press-free crease retained garments having thermosetting resins therein which includes the step of polymerization of the contained resins after the garments have been completely finished and are otherwise ready to wear.

Another important object of the present invention is to provide press-free crease retained garments which will withstand numerous washings without loss of creases or pleats and which are free from wrinkles after drying and during wear.

A still further object of our present invention is to provide a method of the indicated nature for manufacturing press-free crease retained garments which is additionally characterized by controlling the quantity of the introduced non-polymerized resins so that the material of the garments can be easily handled during the cutting, sewing, pressing and otherwise finishing of the garments prior to the polymerization of the resins contained in the finished garments.

Other objects of our invention, together with some of the advantageous features thereof, will appear from the following description of our preferred method of manufacture of garments of the type illustrated in the accompanying drawings. It is to be understood, however, that we are not to be limited to any precise form, style or design of garment nor to any precise fabric treated in accordance with our process, nor to any precise resin or mixture of resins of the thermo-setting type, as our invention, as defined in the appended claims can be embodied in a plurality and variety of forms and the process can be practiced in a plurality and variety of ways.

Referring to the drawings:

Fig. 1 is a sectional elevational view of an oven employed in our improved process, this view illustrating in full lines a treated garment suspended from a rack mounted on a portable truck.

Fig. 2 is a side elevational view of a garment treated in accordance with our improved process.

Fig. 3 is a fragmentary sectional view taken on the line 3—3 of Fig. 4.

Fig. 4 is a cross-sectional view taken on the line 4—4 of Fig. 2.

As illustrated in the accompanying drawings, a garment 11 is provided which is press-free and which retains its creases despite numerous washings, the fabric of the garment being impregnated with an initially water-soluble polymerizable resin 12. The fabric from which the garment 11 is made is cut to the shape and style of the end garment, is sewn; finished and then pressed to provide creases 13 and 14 therein. Thereafter, the garment 11, along with other similarly processed, is disposed on a portable rack 16, using a conventional garment hanger 17; the rack 16 being mounted conveniently upon a portable truck 18 for convenient transportation of garments and movement into and out of an oven 19 hereinafter described.

In accordance with our invention, we initially prepare an aqueous solution of a mixture of water-soluble thermo-setting resins; the solution preferably but not necessarily containing a suitable textile softener, as well as a suitable deodorant. While there are a plurality of resins suitable for our purpose, as well as a number of textile softeners and deodorants all commercially available for making up the indicated aqueous solution, we have successfully employed the commercially available materials set out below in the amounts and percentages indicated to provide our press-free, crease-retained garments. And, while our process may be practiced for the production of garments made up from a variety of different textiles, we have had eminent success with washable pure cotton.

In preparing our preferred aqueous solution, we first provide a mixture of approximately three gallons of a thermosetting urea formaldehyde resin and approximately two gallons of a thermosetting methylated methylol melamine resin or a thermo-setting resin generally referred to in the art as a melamine formaldehyde resin. To this mixture, and for purposes of accelerating the curing of the resins, we add a small amount, say approximately three pints, of an organic acid-type catalyst. Further, approximately three pounds of any textile softener known to the textile art may be dissolved in water and added to the above mixture, and we may finally introduce approximately four pounds of a deodorant, dissolved in water, for inhibiting possible obnoxious odors in the completed garments; such a deodorant may be any deodorant known to the textile art. The foregoing mixture is then introduced with agitation into approximately twenty-five gallons of water to effect the desired quantitative aqueous solution. Thus, our solution for a volume of approximately one hundred gallons plus comprises, by volume, approximately 12 percent of a thermosetting urea formaldehyde resin, approximately 8 percent of a thermosetting methylated methylol melamine resin, or of a so-called melamine formaldehyde resin, approximately 1½ percent of an organic acid-type catalyst, approximately 2½ percent of a textile softener and approximately 2½ percent of a deodorant, in approximately one hundred gallons of water.

Before impregnating any of the cotton fabrics with the aforementioned solution, we preferably thoroughly wash the fabrics in a suitable aqueous soap solution including a suitable detergent to remove starch, gelatine, glucose, dextrine, coloring matter or other impurities so as to avoid undue stiffening of the material, and thereafter rinse the washed fabrics thoroughly in clear rinse water.

The washed and rinsed fabrics are conveniently wound onto rolls and then each selected fabric is successively and continuously impregnated with the above-described solution by passing the fabric through a conventional dipping or padding machine, is stretched and sized on a standard tenter frame and simultaneously dried as it passes along the frame, and is finally rolled onto a suitable drum for transportation to a garment make-up room where the treated fabric is cut, sewed, finished and pressed to provide the completed garment prior to the final step of subjecting the finished garment to the action of heat in a garment-setting oven to effect polymerization and setting of the resins in the garment as an entirety. Preferably, we double-dip the fabrics in the above-described aqueous solution to insure approximately 100% pick-up of the solution by the fabric, and pass the impregnated fabric through squeegee rollers operating under forced pressure to extract excess solution.

In the padding step including squeezing of the fabric, approximately 70% to 80% by weight of the solution is retained in the fabric as it leaves the padding machine for passage through the tenter frame for stretching and setting to size as to width. Whenever it is desired to impart a mechanical finish to the fabric, a conventional flat nip calendar can be employed in conjunction with the tenter frame, the rolls of the calendar being heated to approximately 250° F. to 300° F. for effecting the mechanical finish. It is to be understood that a drying atmosphere of approximately 200° F. is maintained as the fabric is passed along the tenter frame; such drying atmosphere being substantially below the temperature required to cure, set or polymerize the resins on the fabric. That is to say, polymerization of the copolymers of the two resin forming ingredients of the solution with which the fabric is impregnated is deliberately avoided in our improved method during the stages of padding, stretching, finishing and drying.

The final or take-off roller upon which the fabric is rolled after passage through the tenter frame and flat nip calendar, if used, may or may not be heated depending upon the degree of crease resistance desired in the fabric and this is dependent upon the type of fabric being processed; heating of this final or take-off roller usually effecting an increase in the crease resistance of the treated fabric. Preferably, we so control the drying of the solution-impregnated fabrics as to retain approximately 2% to 8% of the moisture content over and above the natural moisture of the fabrics. The entire drum or roller with the processed or impregnated fabric containing the residual moisture content mentioned is then transferred to a garment preparation location for the usual steps of garment manufacture; it being understood that the fabric as worked upon by the garment makers contains unpolymerized or un-set resins.

After garments have been completed by cutting, sewing, finishing and pressing, which may include pleating by a mechanical pleating step, the entire garments are disposed in a garment-setting oven operating at a temperature with the garments contained therein for a sufficient time to effect complete polymerization and setting of the resin in the garments to a water-insoluble state. Of course, the temperature ranges maintained in the garment-setting oven as well as the time ranges of exposure of the garments to the elevated temperatures depend upon the particular weight of the fabrics of which the garments are made as well as the styles of the garments. With relatively light-weight cotton garments, a temperature range of approximately 350° F. to 420° F., and a time of exposure of approximately 15 minutes, satisfactorily cures the contained resins and effects polymerization thereof to a water-insoluble state. For heavier fabrics, the temperature range maintained in the garment-setting oven is between 400° F. and 450° F. with garment exposure time of approximately 15 to 20 minutes.

The particular oven which we have successully employed in our improved method, which is a gas-fired oven although other types may be used, has a capacity of approximately 90 of such garments as blouses, Bermuda shorts, jackets, pedal pushers and shorts, and of approximately 46 dresses, slacks, sport trousers, and the like. The usual controls are included for regulating the temperature of the garment-setting oven, including a throttling valve for adjusting the air and gas flow, and also including a high-limit valve for cutting off gas flow whenever the temperature reaches a predetermined high value, say 470° F. Suitable vents are provided in the oven for allowing escape of air as well as escape of vapors emanating from the heated polymerizable resins. The oven preferably includes a plurality of interiorly mounted thermo-couples arranged at various locations within the oven; such thermo-couples being electrically connected to an indicator for testing the temperature in the oven at such various locations and for indicating the necessity of any adjustments of air or gas flow that might be made to insure uniform heating of all garments placed in the oven.

Our improved method hereinabove described has been successfully practiced in connection with the production of thousands of garments in which creases as well as pleats have been formed. Cotton garments manufactured and processed in accordance with the foregoing steps have been submitted to a nationally recognized testing laboratory with the request that they be tested for their press-free crease retention qualities or properties. This laboratory machine-washed these garments in commercial-type washing machines and reported that after approximately thirty of such washings there was no wrinkling in the garments, creases were retained and were sharp, and no pressing of the garments was considered necessary.

It is to be understood that the appended claims are to be accorded a range of equivalents commensurate in scope with the advance made over the prior art.

We claim:

1. In a process of manufacturing garments unrestricted as to style, size, design and type wherein a garment fabric is impregnated with an aqueous solution of a polymerizable resin and the fabric partially dried at a temperature below the polymerization temperature of the resin so as to maintain the contained resin in an unpolymerized state and approximately 2% to 8% of moisture is retained in the fabric, the steps of cutting said fabric containing the resin in an unpolymerized state to the size, shape and style of desired garments, sewing said fabric to provide desired garment seams, finishing the cut and sewn fabric to completed garments of desired styles and designs, thereafter imparting a crease in each of the completed garments at random locations therein consistent with the designs and styles of the completed garments, and thereafter curing the impregnated, partially dried completed garments to insolubilize the contained resin in situ so that the completed garments are press-free and the imparted creases therein are unaffected after repeated washings of the garments.

2. A method of manufacturing ready-to-wear press-free garments unrestricted as to size, shape, style or design and possessing crease-retention properties, said method comprising the steps of impregnating the fabric of which the garments are made with an aqueous solution of a polymerizable resin, extracting excess solution from the fabric to a predetermined extent causing the retention in the fabric of approximately 70 percent by weight of the resin, drying the fabric at a temperature insufficient to polymerize the contained resin and to an extent as to retain approximately 2 percent to 8 percent of moisture therein, making up from the resin-impregnated and moisture-containing fabric a number of ready-to-wear garments including the pressing of at least one crease in each thereof, and thereafter baking the made up garments in a garment-setting oven under temperatures ranging between 350° F. to 450° F. to polymerize and set the contained resin to a water-insoluble state whereby washable ready-to-wear press-free garments are provided with the imparted crease or creases retained therein after repeated washings of the garments.

3. A method of manufacturing ready-to-wear press-free garments unrestricted as to size, shape, style or design and possessing crease-retention properties, said method comprising the steps of providing an aqueous solution of a mixture of water-soluble polymerizable resins, impregnating the fabric of which the garments are made with said aqueous solution, extracting excess solution from the garments to a predetermined extent to leave approximately 70 percent by weight of the resins therein, drying the solution-impregnated fabric at a temperature insufficient to polymerize the contained resins and to an extent as to retain approximately 2 percent to 8 percent moisture therein, making up from the moisture-containing fabric a number of ready-to-wear garments including the pressing of at least one crease in each of the garments during the making up thereof, and thereafter baking the made up garments in a garment-setting oven under temperatures ranging between 350° F. and 400° F. to polymerize and set the contained resins to a water-insoluble state whereby washable ready-to-wear press-free garments are provided with the imparted crease or creases retained therein after repeated washings of the garments.

4. A method of manufacturing a ready-to-wear press-free crease-retained garment comprising the manufacturing steps of impregnating a fabric of which the garment is to be made with an aqueous solution of a polymerizable resin, extracting a portion of the solution from the fabric so as to retain therein a major amount by weight of the resin, thereafter partially drying the resin-impregnated fabric at a temperature below the polymerization temperature of the contained resin and to an extent to retain approximately 2 percent to 8 percent of moisture in the fabric, making up a garment unrestricted as to size, shape, style or design from the moisture-containing resin-impregnated fabric, imparting at least one crease into the garment during the making up thereof and prior to the completion thereof, finally curing the impregnated, partially-dried and made up garment to insolubilize the resin in situ, whereby a washable ready-to-wear press-free garment is provided with at least one imparted crease therein which is unaffected by repeated washings of the garment and with uncreased areas adjacent to as well as remote from a creased location of the garment which are press-free after repeated washings of the garment.

References Cited in the file of this patent

UNITED STATES PATENTS

| | | |
|---|---|---|
| 387,295 | Gessner | Aug. 7, 1888 |
| 907,673 | Bechtold et al. | Dec. 22, 1908 |
| 1,413,885 | Anderson | Apr. 25, 1922 |
| 2,046,336 | Maywald | July 7, 1936 |
| 2,288,212 | Segelin et al. | June 30, 1942 |
| 2,440,573 | Brode | Apr. 27, 1948 |
| 2,449,534 | Meyer | Sept. 14, 1948 |
| 2,769,584 | Zinamon et al. | Nov. 6, 1956 |
| 2,817,468 | Brown | Dec. 24, 1957 |

FOREIGN PATENTS

| | | |
|---|---|---|
| 540,086 | Great Britain | Oct. 6, 1941 |
| 599,237 | Great Britain | Mar. 8, 1948 |